United States Patent [19]

Sasaki

[11] 4,370,698
[45] Jan. 25, 1983

[54] THROUGH TYPE HIGH-WITHSTAND-VOLTAGE CERAMIC

[75] Inventor: Setsuo Sasaki, Nikaho, Japan

[73] Assignee: TDK Electronics Co., Ltd., Japan

[21] Appl. No.: 177,374

[22] Filed: Aug. 12, 1980

[30] Foreign Application Priority Data

Oct. 8, 1979 [JP] Japan .......................... 54/139387[U]
Dec. 17, 1979 [JP] Japan .......................... 54/174705[U]
Jan. 19, 1980 [JP] Japan ............................ 55/5103[U]

[51] Int. Cl.³ ............................................. H01G 4/42
[52] U.S. Cl. ..................................... 361/330; 361/272; 361/302; 361/321; 361/328; 361/329
[58] Field of Search ............... 361/272, 321, 328, 329, 361/330, 302

[56] References Cited

U.S. PATENT DOCUMENTS 2,503,912 4/1950 Kimball .............................. 361/329

Primary Examiner—Elliot A. Goldberg
Attorney, Agent, or Firm—Martin Novack

[57] ABSTRACT

In elliptical shaped insulated high voltage ceramic capacitors, subjected to higher heat and temperature, stresses are formed which causes gaps between the insulation and ceramic capacitor. To solve this and other problems a hollow elliptical shaped plastic cover is positioned below the capacitor ground conductor. The cover has a bridge which separates the cross section of the cover into two substantially circular areas an insulator is injected into the cover which also covers the capacitor.

18 Claims, 30 Drawing Figures

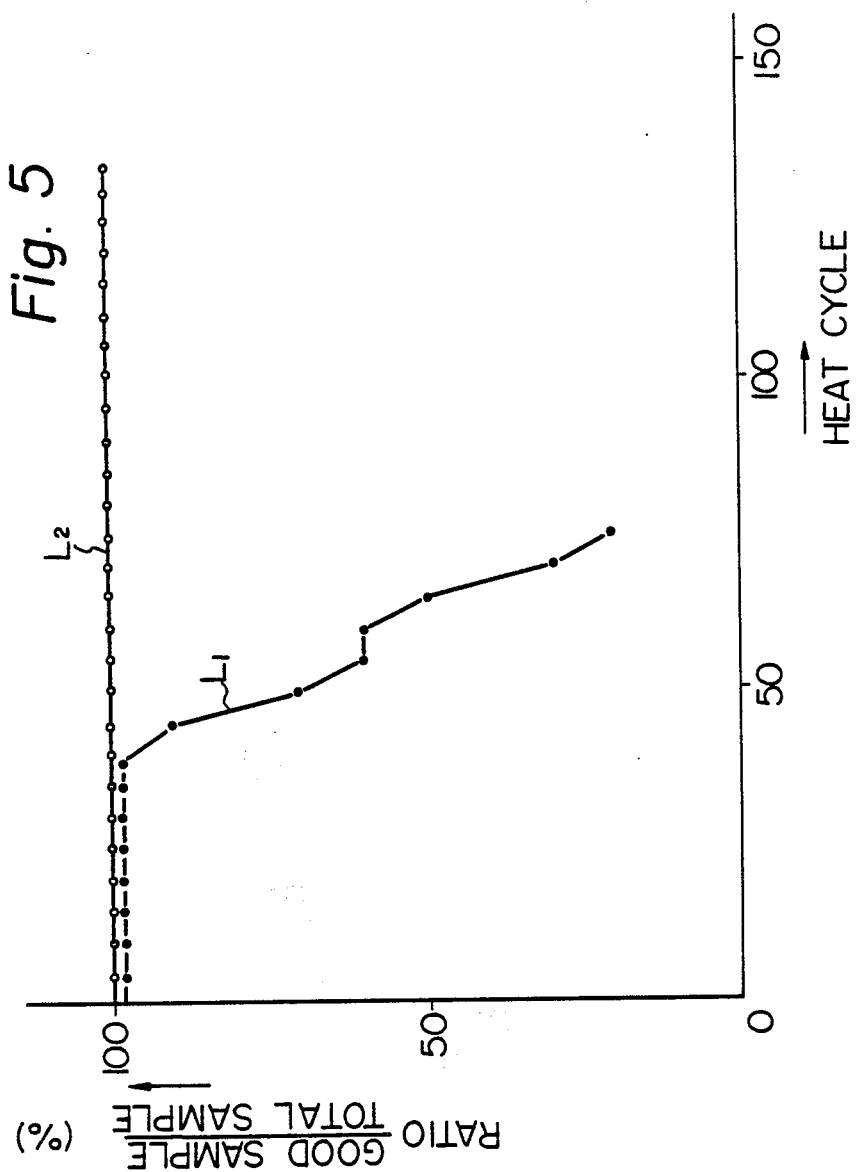

THROUGH TYPE HIGH-WITHSTAND-VOLTAGE CERAMIC

BACKGROUND OF THE INVENTION

The present invention relates to a through type high withstand voltage ceramic capacitor, in particular, relates to such a capacitor for the use in the noise filter in a high power and high frequency apparatus, like a microwave oven, a broadcasting transmitter and/or an X-ray generator.

In a high frequency and high power apparatus operating in the VHF band or UHF band, the noise superposed on a commercial power line must be prevented. For that purpose, a noise filter, which is actually a low-pass filter is inserted in a power supply line of an apparatus.

FIG. 1A shows the circuit diagram of a noise filter inserted in a power supply line of a heater of a magnetron in a microwave oven. In FIG. 1A, the capacitors $C_1$ and $C_2$, and the inductors $L_1$ and $L_2$ compose a noise filter, the reference numeral 100 is a conductive filter housing, 102 is a magnetron, 104 is a heater of the magnetron 102, and 106 is an anode of the magnetron 102, and that anode is grounded.

The capacitors $C_1$ and $C_2$ must have a high withstand voltage, since a magnetron has a high operational voltage between an anode electrode and a heater. Further, those capacitors must have excellent temperature characteristics, since those capacitors are repetitively heated to a high temperature in a microwave oven.

The present invention relates to the improved structure of a capacitor for the use in for instance the noise filter in a microwave oven.

The capacitor for that purpose is a through capacitor, and two separate capacitors, or a twin capacitor which has two capacitors in a single housing is utilized for that purpose.

FIG. 1B shows the example of a prior twin through capacitor for a noise filter, FIG. 1C is a cross sectional view of the capacitor of FIG. 1B, and FIG. 1D is the cross sectional view of the noise filter utilizing a twin capacitor of FIGS. 1B and 1C.

In those figure, an elliptic ceramic body 1 has a pair of holes 2 and 3 in the thick vertical direction of the ceramic body 1. On the upper surface of the ceramic body 1, a pair of separated electrodes 4 and 5 having corresponding holes are attached, and on the lower surface of the ceramic body 1 a common electrode 6 is attached. The rectangular ground conductor 7 has a plate 7c and a elevated portion 7a. The plate 7c has four holes 7c-1 through 7c-4 for fixing the twin capacitor to the filter housing, and the elevated portion 7a has a pair of holes 9 and 10 which correspond to the holes 2 and 3 on the ceramic body 1, and said elevated portion 7a has also a plurality of small holes 7b along the peripheral line of the elevated portion 7c. Those small holes 7b serve to flow an insulating means as described later. The common electrode 6 is fixed on the elevated portion 7a of the ground conductor 7 so that the holes 9 and 10 coincide with the holes 2 and 3, respectively, and the small holes 7b are positioned outside of the ceramic body 1. The pair of elongated through conductors 11 and 12 are inserted in the holes 2 and 3, and the holes 9 and 10, respectively, so that those conductors 11 and 12 do not electrically contact with the common electrode 6. In order to assure the insulation between the common electrode 6 and the conductor rods 11 and 12, those rods 11 and 12 are covered with flexible plastics tubes (insulation tubes) 15 and 16, respectively. The caps 13 and 14 are put on the upper portion of the conductive rods 11 and 12, respectively, and those caps 13 and 14 are soldered to both the conductive rods 11 and 12, and the electrodes 4 and 5, respectively, in order to assure the electrical contact between the rods 11 and 12, and the electrodes 4 and 5, respectively. Those caps 13 and 14 also have elevated portions which have a plurality of small holes 13a and 14a, respectively, along the each peripheral line. The hollow elliptic cylindrical plastic cover 8 is attached under the ground conductor 7 so that said cover 8 encloses the rods 11 and 12 with the tubes 15 and 16, respectively.

The insulation filler 17, which is for instance epoxy resin, covers the portion of the bottom of the cover 8, and the periphery of the ceramic body 1, the caps 13 and 14 and the rods 11 and 12, as shown in FIG. 1C. In injecting the insulation filler 17, the capacitor body is covered with the cover 18, and the filler 17 is injected in the capacitor from the bottom of the cover 8. The injected insulation filler is injected into the capacitor through the small holes 7b provided on the ground conductor 7, and the small holes 13a and 14a provided on the caps 13 and 14, and thus, the area inside of the cover 18 is filled with the insulation filler 17. After the filler thus injected is hardened, the cover 18 is removed, and the twin capacitor is completed, and the insulation and the protection of the capacitor from the moisture are assured by the injected epoxy resin.

However, a prior twin capacitor as described above has the disadvantages as follows.

The first disadvantage is that the life time of a capacitor is rather short when utilized in a microwave oven. The reason for that short life time comes from the substantially elliptic shape of the filled insulator 17. Because of the elliptic insulator 17, the distribution of the stress generated in the insulator 17 is not uniform. That nonuniform stress is generated in the insulator 17 when the insulator 17 is cooled and hardened in the manufacturing stage, and/or the capacitor is repetitively heated in a microwave oven. In particular, in the case of a microwave oven with a steam oven, the capacitor is disposed in the atmosphere with high temperature and high moisture repetitively. The nonuniform stress in the insulator 17 generated by the temperature change causes gaps and/or cracks between the insulator 17 and the capacitor components (ground conductor 7, cover 8, and/or conductor rods 11 and 12 et al). If gaps and/or cracks are generated, the electromagnetic fields in the cracks are increased, and the withstand voltage and/or the voltage at which an arc is generated is decreased.

Another disadvantage of the prior twin type capacitor is that the particular design consideration is necessary for the conductor rods 11 and 12, the insulator 17 and the cover 8 because of the nonuniform distribution of the stress in the insulator 17.

Another disadvantage of the prior twin type capacitor is that the size of the capacitor must be large in order to assure the preferable withstand voltage in spite of the generation of gaps and/or cracks.

It should be appreciated that said nonuniform stress in the insulator comes from the substantially elliptic shape of the insulator, and said elliptic shape comes from the twin capacitor. In case of a single capacitor, the whole body is circular, and the stress in the body is uniform, and thus, the disadvantage described above does not exist.

SUMMARY OF THE INVENTION

It is an object of the present invention, therefore, to overcome the disadvantages and limitations of a prior through type high withstand voltage ceramic capacitor by providing a new and improved through type high withstand voltage ceramic capacitor.

It is also an object of the present invention to provide such a capacitor which has a long life time and is superior of the withstand voltage characteristics.

Another object of the present invention is to provide such a capacitor which is not degraded in spite of repetitive change of the ambient temperature.

The above and other objects are attained by a ceramic capacitor comprising (a) a rectangular ground conductor plate having holes for fixing the same to an external device with screws and a pair of holes, (b) a capacitor half assembly having an elliptic column shaped ceramic body, a pair of first electrodes attached on one surface of the column so that those electrodes are electrically separated from each other, and a common electrode disposed on the other surface of the column, and said ceramic body together with the attached electrodes having a pair of holes in the thick vertical direction of the column and said capacitor half assembly being disposed on said ground conductor plate so that said pair of holes of the ground conductor plate coincides with those of the capacitor half assembly, (c) a pair of circular caps disposed on each of said separated electrodes, (d) a pair of conductor rods each piercing holes of said ground conductor plate, the capacitor half assembly and the cap, and said conductor rods being fixed to said caps so that the conductor rod is electrically coupled with the related electrode, (e) a pair of insulation tubes covering the conductor rods in said capacitor half assembly, (f) a hollow substantially elliptic column shaped plastic cover positioned below said ground conductor plate enclosing said conductor rods, said cover having a bridge across a pair of substantially parallel side walls of said cover so that said bridge separates the cross section of the cover to two substantially circular areas, and (g) an insulator injected into said cover and enclosing said capacitor half assembly.

Preferably, said capacitor half assembly is covered with a plastic housing which is filled with an insulator, and the housing has also a bridge which separates the housing into two substantially circular portions substantially.

BRIEF DESCRIPTION OF THE DRAWINGS

The foregoing and other objects of the present invention will be better understood by means of the following description and the accompanying drawings wherein;

FIG. 5 shows the curves showing the test results for the present twin capacitor.

DESCRIPTION OF THE PREFERRED EMBODIMENTS

Figure 1A:
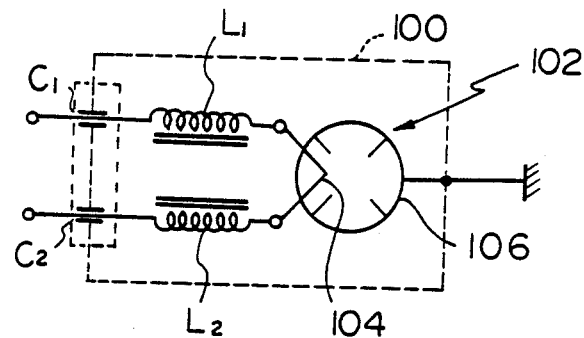
FIG. 1A shows a circuit diagram of a noise filter utilized in a magnetron tube in a microwave oven utilizing a pair of capacitors.
Figure 1D:
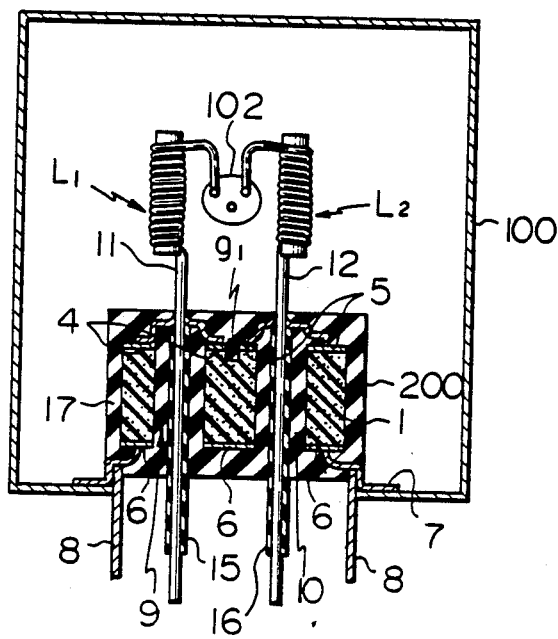
FIG. 1D shows a cross sectional view of the noise filter of FIG. 1.
Figure 1B:
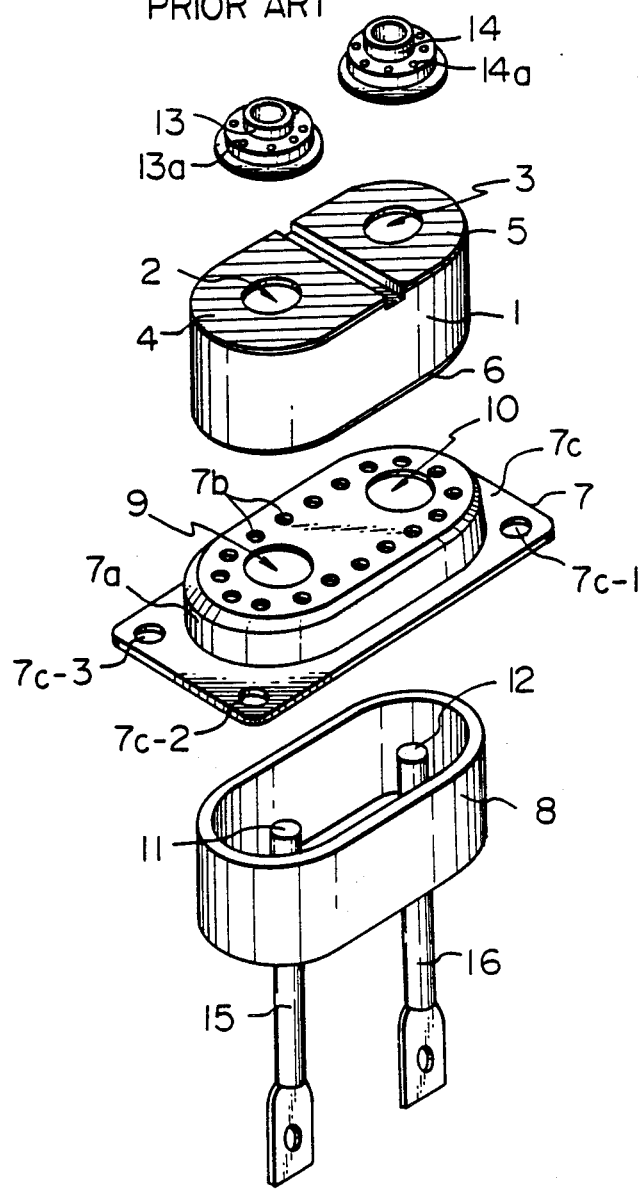
FIG. 1B is a disassembled view of a prior twin capacitor.
Figure 1C:
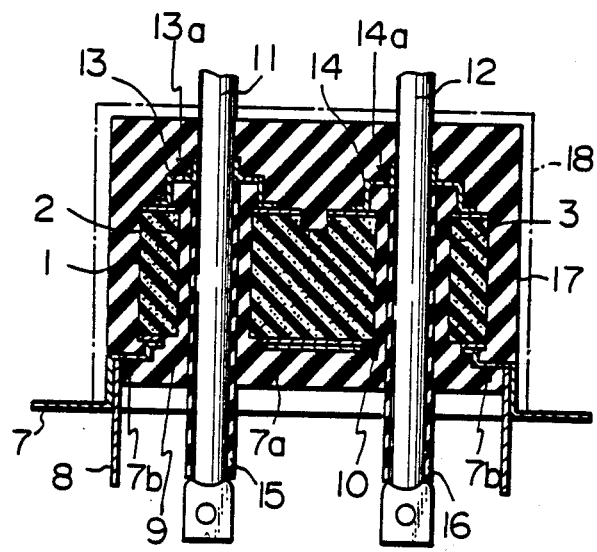
FIG. 1C is a cross sectional view of a prior twin capacitor.
Figure 2:
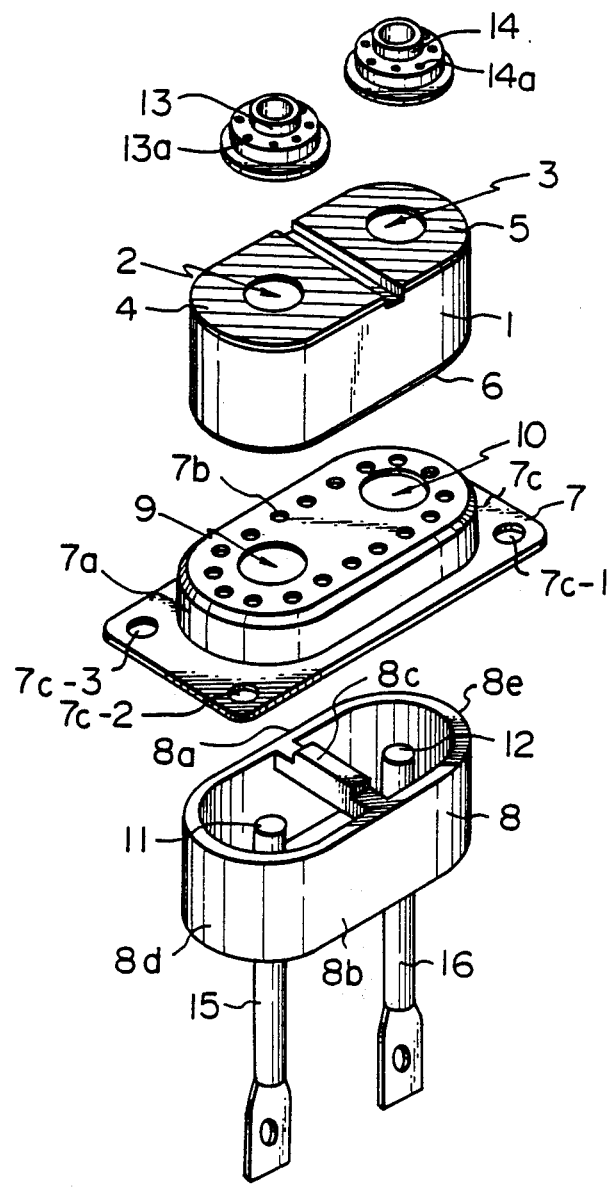
FIG. 2 is a disassembled view of the twin capacitor according to the present invention.
Figure 3:
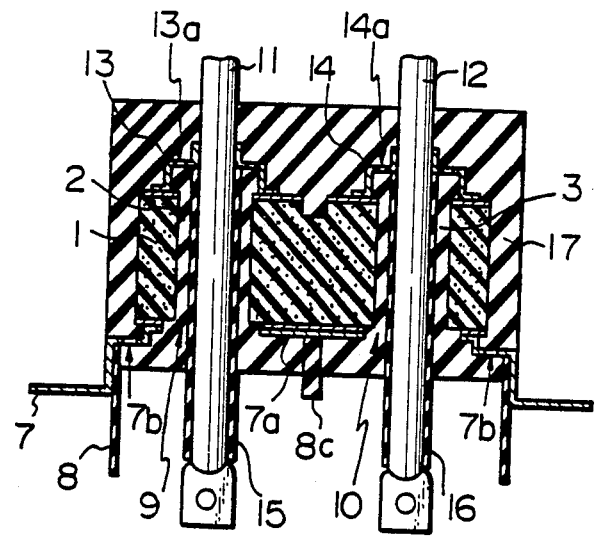
FIG. 3 is a cross sectional view of the capacitor of FIG. 2, FIGS. 4A and FIG. 4B are explanatory drawings for an explanation of the stress applied to the insulator for an explanation of the effect of the present capacitor of FIGS. 2 and 3.

FIG. 2 shows the structure of the present ceramic capacitor, and FIG. 3 is the cross sectional view of the ceramic capacitor of FIG. 2. In those figures, the same reference numerals as those in FIG. 1B show the same members as those in FIG. 1B. In those figures, an elliptic ceramic body 1 which is made of barium titanate or titanium oxide has a pair of holes 2 and 3 in the thick vertical direction of the ceramic body 1. On the upper surface of the ceramic body 1, a pair of separated electrodes 4 and 5 having corresponding holes are attached, and on the lower surface of the ceramic body 1 a common electrode 6 is attached. The substantially rectangular ground conductor 7 has a plate 7c and an elevated portion 7a on the plate 7c. The plate 7c has four holes 7c-1 through 7c-4 for fixing the twin capacitor to the filter housing by screws, and the elevated portion 7a has a pair of holes 9 and 10 which correspond to the holes 2 and 3 on the ceramic body 1, and said elevated portion 7a has also a plurality of small holes 7b along the peripheral line of the portion 7a. Those small holes 7b serve to allow the flow of an insulating means as described later. The common electrode 6 is fixed on the elevated portion 7a of the ground conductor 7 so that the holes 9 and 10 coincide with the holes 2 and 3, respectively, and the small holes 7b are positioned outside of the ceramic body 1. The pair of elongated through conductors 11 and 12 are inserted in the holes 2 and 3, and the holes 9 and 10, respectively, so that those conductors 11 and 12 do not electrically contact with the common electrode 6.

With the above structure, it should be appreciated that a capacitor half assembly is composed of the ceramic body (1), the separated pair of electrodes (4, 5) and the common electrode (6). The first capacitance is provided between the electrodes 4 and 6 through the ceramic body 6, and the second capacitance is provided between the electrodes 5 and 6 through the ceramic body. The common electrode 6 is grounded through the ground conductor plate 7 to the external ground, and the electrodes 4 and 5 are connected to external circuits through the conductor rods 11 and 12.

In order to assure the insulation between the common electrode 6 and the conductor rods 11 and 12, those rods 11 and 12 are covered with flexible plastics tubes (insulation tubes) 15 and 16, respectively. The caps 13 and 14 are pierced by the conductive rods 11 and 12, respectively, and those caps 13 and 14 are soldered to both the conductive rods 11 and 12, and the electrodes 4 and 5, respectively, in order to assure the electrical contact between the rods 11 and 12, and the electrodes 4 and 5, respectively. Those caps 13 and 14 also have elevated portions which have a plurality of small holes 13a and 14a, respectively, each along the peripheral line. The hollow elliptic cylindrical plastic cover 8 is attached under the ground conductor 7 so that said cover 8 encloses the rods 11 and 12 with the tubes 15 and 16, respectively. The cover 8 is essentially elliptically shaped column having a pair of parallel long linear walls 8a and 8b, and a pair of half-circular walls 8d and 8e connecting said long linear walls. The cover 8 has a bridge 8c across the top portion of the same across the centers of said parallel long linear walls 8a and 8b (along the minor axis of the ellipse) so that said bridge 8c separates the space in the cover 8 into two substantially circular areas. The presence of said bridge 8c is the important feature of the present twin capacitor. Due to the presence of the bridge 8c, the cover 8 has two substantially circular (or square) areas, while the inner area of the cover 8 of FIG. 1B is essentially elliptic.

The insulation filler 17, which is for instance epoxy resin, covers a portion of the bottom of the cover 8, and the outside portion of the ceramic body 1, the caps 13 and 14 and the rods 11 and 12, as shown in FIG. 3. In filling the insulation filler 17, the capacitor body is covered with a cover (not shown), and the filler 17 is injected in the capacitor from the bottom of the cover 8. The injected insulation filler is injected into the capacitor through the small holes 7b provided on the ground conductor 7, and the small holes 13a and 14a provided on the caps 13 and 14, and thus, the area inside of the cover 18 is filled with the insulation filler 17. After the filler thus injected is hardened, the cover (not shown) is removed, and the twin capacitor is completed.

An important feature of the present invention is the presence of the bridge 8c between the longer side walls 8a and 8b of the cover 8 as described before. We found experimentally that the twin capacitor having that bridge 8c is excellent in keeping the withstand voltage. It should be appreciated that the stress generated in an insulator (filler) is distributed uniformly when the shape of the insulator is circular. And, the insulator 17 in the twin capacitor separated by the bridge 8c is essentially circular.

Figures 4A, 4B:
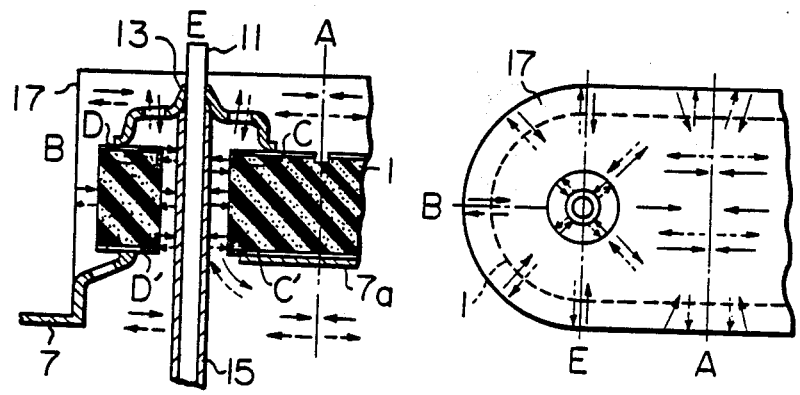

FIGS. 4A and 4B show the stress generated in the insulator 17 when no bridge 8c is provided. In that figure, the solid line shows the stress when the insulator is expanding, and the dotted line shows the stress when the insulator is contracting. If no bridge is provided, the expansion and/or the contraction of the insulator 17 is symmetrical relating to the axis A which is the symmetrical line of the twin capacitor itself, and so, the stress or the expansion/contraction of the insulator at the edges C, C', at the inner side of the hole 2 of the ceramic body 1 is different from that at the edges D and D' at the outer side of the ceramic body 1 but near the external wall B. That is to say, the strong edge covering occurs at the sides of C and C' which are closer to the symmetrical axis A in every expansion and/or the contraction, while the edge covering is weak at the edge D during expansion step, and the edge covering is also weak at the edge D' during the contraction step. Therefore, gaps and/or cracks are generated at the portion (D, D') where an edge covering is weak, and a twin capacitor is destroyed by those gaps and/or cracks.

Said edge covering has the effect that the thickness of a film of a paint and/or an insulator covering a rectangular body is thin at edge portions of the rectangular body. It should be appreciated that the holes 2 and 3 has edges (C, C', D, D') at the upper and lower openings, and thus, the edge covering effect occurs at those edges, and the thickness of an insulator is thicker at the edges C and C', and is thinner at the edges D and D' as described above.

On the other hand, with the bridge 8c which separates the insulation cover 8 into two equal areas, the center of the expansion/contraction of the insulator 17 is switched to the center of each area, which coincides with the axis E of the hole 2 and/or 3, because the length between the center E of the stress and those edges (C, C', D, D') is equal to one another. Therefore, the stress in the insulator 17 is distributed uniformly. Since the bridge 8c prevents the expansion/contraction of the insulator 17, the bridge 8c operates as a buffer for the stress of the insulator 17, and the bridge 8c supports the mechanical strength of the bottom portion of the cover 8. Thus, the stress in the insulator 17 is decreased, and the distribution of the stress becomes uniform.

The height of the bridge 8c above the edge of the cover 8 is designed according to the nature of the material of the insulator 17 and the cover 8.

When the insulator 17 is made of epoxy, and the cover 8 is made of nylon 66 which does not adhere with epoxy, the bridge 8c is designed so that the top of the bridge 8c is above the upper level of the cover 8 in order to provide the excellent characteristics during heat cycle test.

When the insulator 17 is made of epoxy, and the cover 8 is made of poly-butylene-terephthalate which adheres with epoxy, the experiment shows that the height of the bridge 8c does not effect the heat cycle characteristics test.

FIG. 5 shows the curves demonstrating the effect of the present invention, in which the curve $L_1$ shows the characteristics of a prior twin capacitor which does not have a bridge, and the curve $L_2$ shows the characteristics of the present twin capacitor which has a bridge 8c. In FIG. 5, the horizontal axis shows the repetition times of the cycle of heating and cooling, and the vertical axis shows the ratio of the good samples to the total number of samples. The test conditions of the experiment of FIG. 5 are; the temperature is changed from $-30°$ C. to +120° C. or vice versa in three hours and the full cycle in those changes is counted as one heat cycle, and the voltage of AC 12 kV (peak-to-peak) is applied for five seconds to the capacitors in every five cycles. When the capacitor is short-circuited, that capacitor is deemed to have become unoperational. In FIG. 5, it should be appreciated that a prior capacitor becomes unoperational in 50 heat cycles, while the present capacitor is still operational after 130 times of heat cycle test.

As described above in detail, due to the presence of a bridge 8c across the parallel longer walls of the cover 8, the stress in the insulator 17 is distributed uniformly, and then, the present capacitor is utilized in spite of the frequent temperature change.

Figure 6:
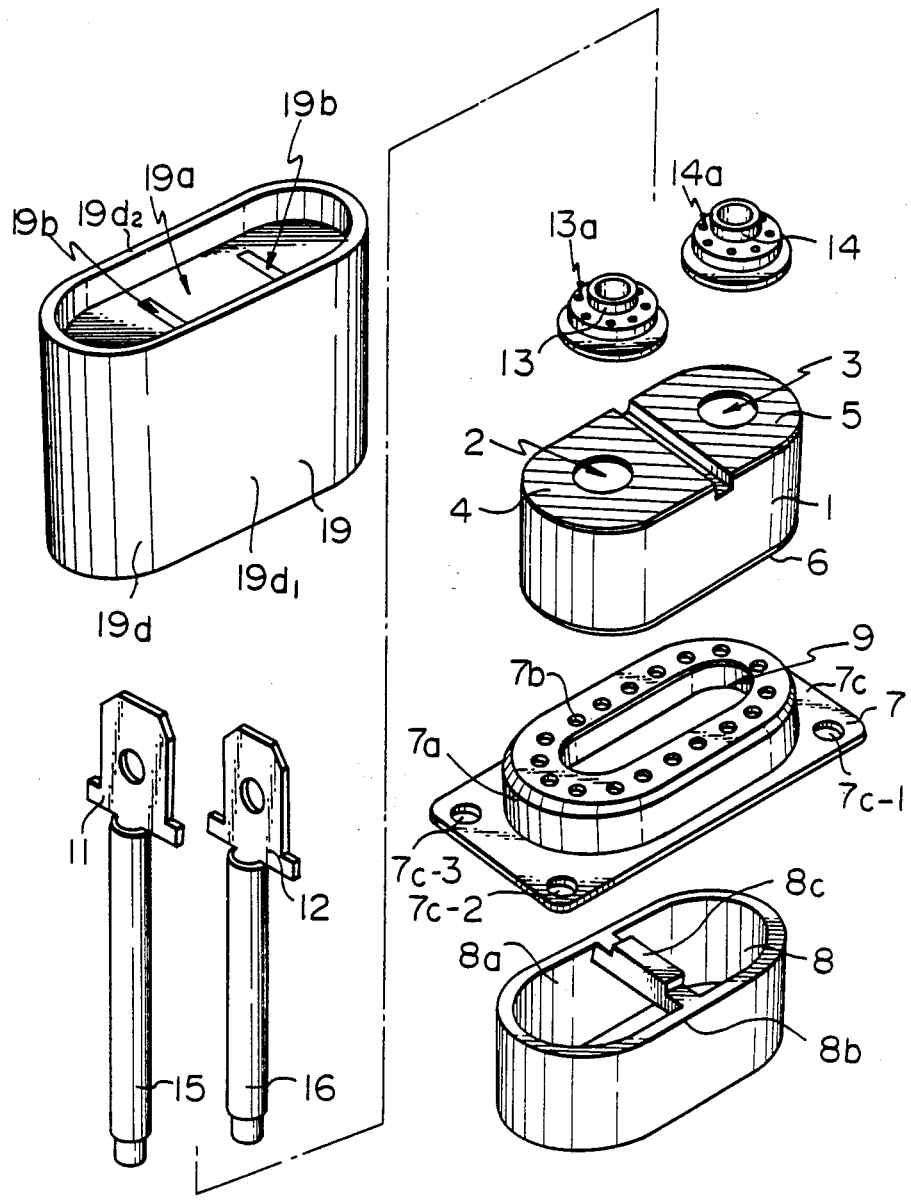
FIG. 6 is a disassembled view of another embodiment of the twin capacitor according to the present invention.
Figure 7:
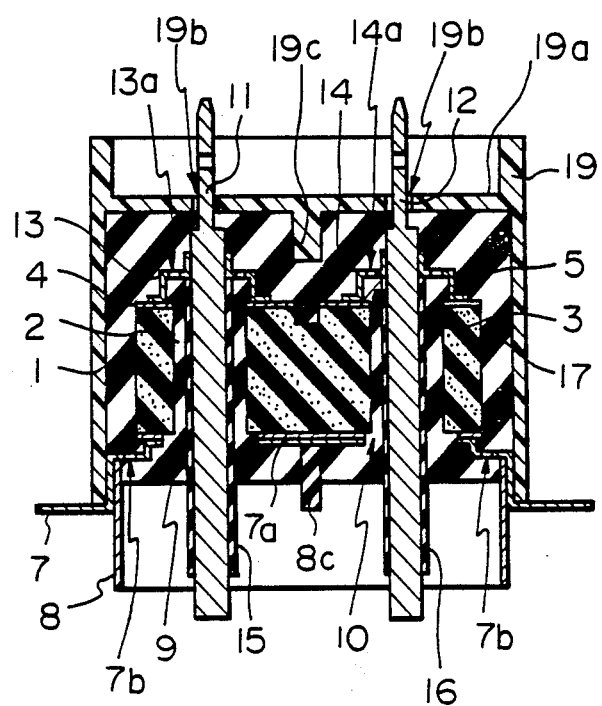
FIG. 7 is a cross sectional view of the twin capacitor of FIG. 6.

Now, another embodiment of the present invention is described in accordance with FIGS. 6 and 7, in which the same reference numerals as those in FIG. 2 show the same members as those in FIG. 2.

The feature of the embodiment of FIGS. 6 and 7 is the presence of the housing 19, which mounts the twin capacitor together with the insulator 17. In the embodiment of FIG. 2, the cover 18 is removed after the insulator 17 is hardened, however, the housing 19 in FIGS. 6 and 7 is not removed. Of course the housing 19 operates as the cast or the cover when the insulator 17 is injected.

The housing 19 has a hollow cylindrical external wall 19d, which is essentially elliptic for mounting an elliptic twin capacitor. At the upper portion of the wall 19d, a flat cover 19a having a pair of elongated holes 19b is provided. Said pair of holes 19b accept the conductor rods 11 and 12. The top portion of the conductor rods 11 and 12 is shaped flat as shown in FIG. 6 so that that portion can go through the holes 19b. Further, the bridge 19c is provided across the parallel walls (19d$_1$, 19d$_2$) of the external wall 19d at the center of the flat cover 19a (see FIG. 7). The presence of that bridge 19c is an important feature of the present invention.

In manufacturing the twin capacitor, the housing 19 covers the capacitor, and the insulator 17 is injected into the housing 19. That process is the same as that of the capacitor of FIG. 2. While the cover 18 in FIG. 2 is removed after the insulator 17 is hardened, the housing 19 is not removed, and thus, the bridge 19c exists as the component of the capacitor.

Accordingly, the insulator 17 surrounding the capacitor body is separated into the two essentially circular portions by said bridge 19c, as shown in FIG. 7. Accordingly, although the insulator 17 is elliptic itself, the stress by the temperature change of the insulator distributes uniformly due to the presence of said bridge 19c. Since the embodiment of FIGS. 6 and 7 has two bridges 8c and 19c, at the bottom portion and the top portion of the capacitor, the stress of the insulator 17 is more uniform than that of the embodiment of FIG. 2. Further, the embodiment of FIGS. 6 and 7 has the advantage that the productivity of a capacitor is improved as the manufacturing step for removing the cover 18 is not necessary.

Preferably, the coefficient $\alpha_1$ of linear expansion of the insulator 17 is larger than the linear expansion coefficient $\alpha_2$ of the external housing 19 and/or the cover 8. Of course the housing 19 and cover 8 must be incombustible. The example of the material of the housing 19 and the cover 8 is flexible epoxy resin like nololak epoxy or polyglycol type epoxy, which is available on the market with the tradename Epicoat or Araldyte. The coefficient $\alpha_1$ of those materials is rather large, and is approximately $\alpha_1 = 9.3 \times 10^{-5}/°C$. On the other hand, the example of the material of the insulator 17 is polybutylene terephthalete or polyethylene terephthalete, in which the coefficient $\alpha_2$ of linear expansion is in the range $\alpha_2 = 2.3 \times 10^{-5}/°C.-2.5 \times 10^{-5}/°C$. Therefore, the relationship $\alpha_1 > \alpha_2$ is satisfied.

Figure 8:
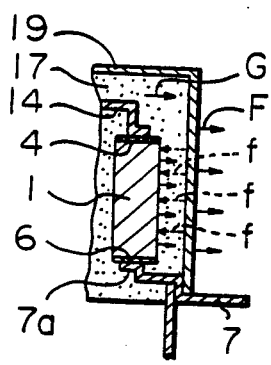
FIG. 8 shows a part of a cross section of the capacitor of FIG. 6 for an explanation of the effect of that capacitor.

When the above relationship between $\alpha_1$ and $\alpha_2$ is satisfied, the expansion of the housing 19 as shown by the arrow F in FIG. 8 when the temperature is increased, is smaller than the expansion of the insulator 17 as shown by the arrow G in FIG. 8. Accordingly, the expansion of the insulator 17 is suppressed by the housing 19, then, the strength (f) for pushing the insulator 17 on the surface of the ceramic body 1 is generated. Accordingly, gaps and/or cracks on the surface of the ceramic body 1 are prevented, and the operational characteristics of the capacitor for high voltage is considerably improved. On the contrary, if the above relationship between $\alpha_1$ and $\alpha_2$ is reversed, the housing 19 expands more than the insulator 17, and then, the gaps and/or cracks are generated on the surface of the ceramic body 1, thus, said gaps and/or cracks deteriorate the high voltage characteristics of the capacitor.

Figure 9:
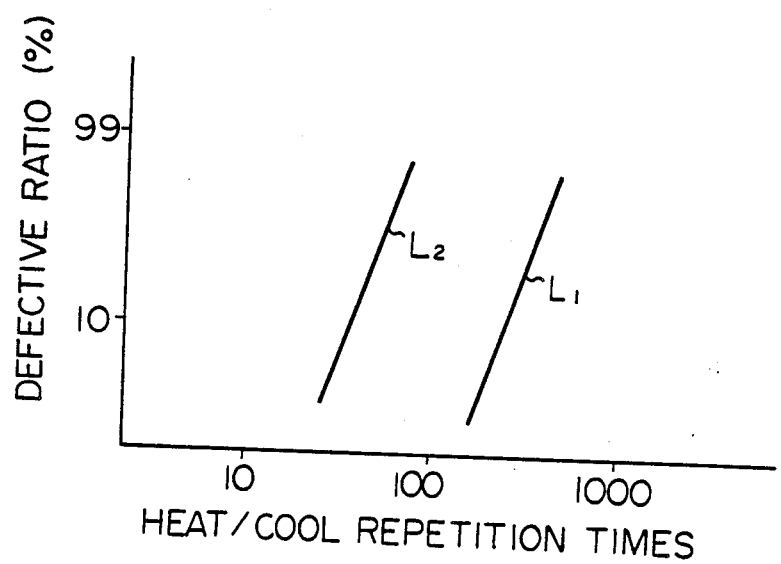
FIG. 9 shows experimental curves for the twin capacitor of FIG. 6, FIGS. 10A, 10B, 10C and 10D show the structure of the capacitor half assembly and a improvement of the slit in the ceramic body according to the present invention.

FIG. 9 shows curves of the high voltage characteristics, in which the curve $L_1$ shows the characteristics of the present capacitor, and the curve $L_2$ shows the characteristics of the prior capacitor in which $\alpha_1$ is smaller than $\alpha_2$. In FIG. 9, the horizontal axis shows the repetition times of the heat/cool cycle, and the vertical axis shows the defective ratio of the sample capacitors. As shown in FIG. 9, a prior capacitor has become practically defective in 100 heat/cool cycles as shown in the curve $L_2$, while the present capacitor is relatively effective after 100 heat/cool cycles.

Other experimental conditions of FIG. 9 are the same as those of FIG. 5.

Now, some modifications of the present twin capacitor are described.

The first modification concerns the gap between the electrodes 4 and 5, and is described in accordance with FIGS. 10A, 10B, 10C, 10D, 11A and 11B. It should be appreciated that the gap between the electrodes 4 and 5 should be as small as possible in order to provide the high withstand voltage between the electrode 4 (or 5) and the common electrode 6. However, the withstand voltage between the electrodes 4 and 5 must be larger than the predetermined value, since a high voltage is applied between the electrodes 4 and 5 when the capacitor is utilized in a noise filter as shown in FIG. 1A. Therefore, the gap between the electrodes 4 and 5 must be designed so that both the withstand voltage between the electrodes 4 and 5, and the withstand voltage between the electrode 4 (or 5) and the common electrode 6 are larger than the predetermined requested value.

The solution for satisfying those requests of the capacitor according to the present invention, is to provide a slit in the ceramic body 1 between the electrodes 4 and 5. The shape and the size of that slit are designed to provide the maximum withstand voltages.

Figure 10A:
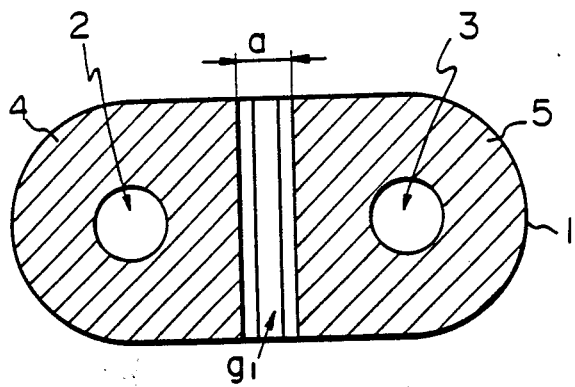
Figure 10B:
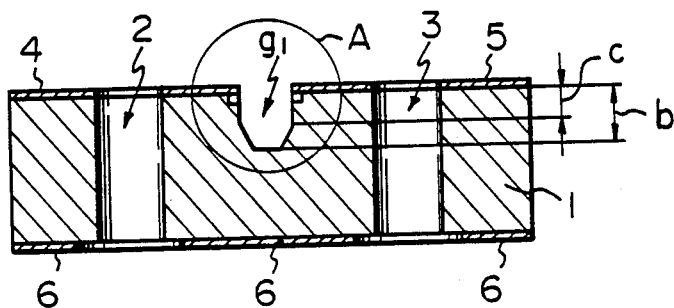
Figure 10C:
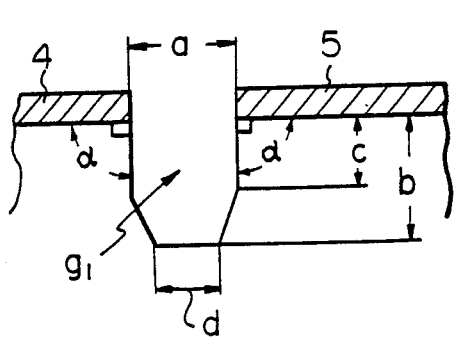

FIG. 10A is the plane view of the ceramic body 1 together with the electrodes 4 and 5, FIG. 10B is the vertical cross sectional view of FIG. 10A, and FIG. 10C is the one embodiment of the enlarged view of the circled portion A in FIG. 10B. In those figures, an elongated gap $g_1$ is provided between the electrodes 4 and 5 in the ceramic body 1. The cross sectional shape of that gap $g_1$ is essentially rectangular, but the width (a) at the top of the slit is larger than the width (d) at the bottom of that slit. The depth of that slit is (d), and the depth of the wider portion of that slit is (c).

According to the present invention, the angle ($\alpha$) between the surface line of the electrodes 4 and 5, and the slit $g_1$ is determined so that the angle ($\alpha$) is equal to or less than 90 degrees. With that angle, the concentration and/or the leak of the electric field at the edge of the electrodes 4 and 5 is minimized.

Figure 11A:
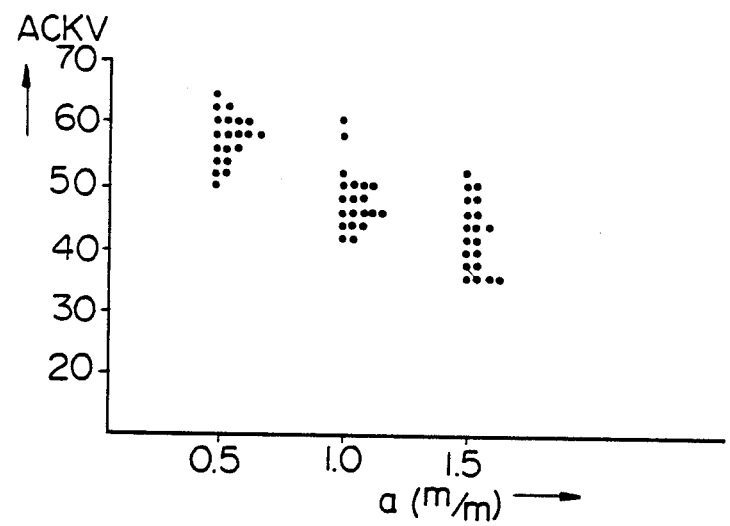
FIGS. 11A and 11B show experimental results relating to the structure of the slit between two electrodes and the breakdown voltage of the present capacitor.

Further, the lengths, (a, b, c and d) of the slit $g_1$ is determined so that the withstand voltage is maximum. FIG. 11A shows the experimental relations between the length (a) and the puncture (or breakdown) voltage between the electrode 4 (or 5) and the common electrode 6 of the capacitor, where b=0.8 mm, c=0.3 mm, d=(a−0.3) mm, and the shape and the thickness of the ceramic body 1 are predetermined. The vertical axis of FIG. 11A shows the breakdown voltage of the alternate voltage in kilo-volts. The tests were performed for a=0.5 mm, a=1.0 mm, and a=1.5 mm, and each test was carried out for 20 samples. The breakdown voltage of each sample in the test was plotted in FIG. 11A. FIG. 11A shows that the smaller the length (a) is, the higher the breakdown voltage of the capacitor is, and when the length (a) is 0.5 mm, the breakdown voltage is almost satisfactory. Therefore, the length (a) is preferably as short as possible, and preferably, that length (a) is 0.5 mm.

Figure 11B:
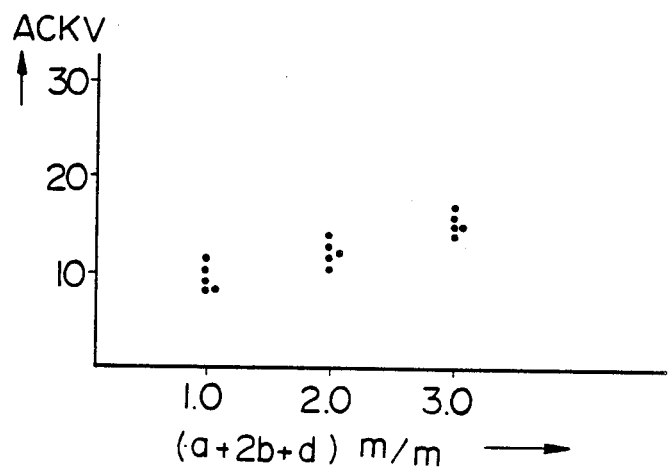

FIG. 11B shows another experiment, in which the total periphery length $L=(a+2b+d)$ of the slit $g_1$ is a parameter, and the breakdown voltage between the electrode 4 and the electrode 5 for the total length 1.0 mm, 2.0 mm and 3.0 mm is tested. It should be appreciated that the higher the breakdown voltage is, the longer the total length is, and that when the total length is longer than 2.0 mm, the breakdown voltage is higher than 10 kilovolts, which is the maximum operational voltage of a commercial microwave oven. When the total length L is between 2 mm and 3 mm, and the length (a) is 0.5 mm, the length (b) is in the range between 0.5 mm, and 1.0 mm, assuming that (a=d). On the other hand, when the length (b) is 0.5 mm, and the total length L is less than 3.0 mm, the width (a) must be 1.0 mm, which also provides the sufficient breakdown voltage as shown in FIG. 11A.

From the above description, the preferred size of the slit ($g_1$) is the width (a) of the slit and the depth (b) of the slit are in the range between 0.5 mm and 1.0 mm. And with that size of slit, the breakdown voltage between the upper electrode 4 and/or 5, and the common electrode is about 60 kilo-volts, and the breakdown voltage between the upper electrodes 4 and 5 is higher than 10 kilovolts.

Figure 10D:
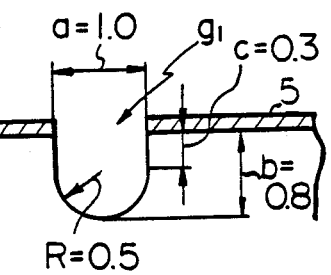

FIG. 10D is the alternative of the embodiment of FIG. 10C, and the feature of FIG. 10D is that the bottom of the slit $g_1$ is circular. When the length of each portion of the slit $g_1$ is designed as shown in FIG. 10D, the capacitor has the sufficient breakdown voltage. The embodiment of FIG. 10D has the advantage because of the presence of the circular bottom (the radius R=0.5 mm), so that the insulator 17 injected in the capacitor fills completely the slit $g_1$, and thus, the breakdown voltage characteristics are improved.

According to one embodiment of the present twin capacitor, the main component of the ceramic body 1 is barium titanate with the relative dielectric constant $\epsilon=6000$, the longer diameter, the shorter diameter, the thickness of the ceramic body 1 are 24 mm, 12 mm and 9 mm, respectively, the width and the depth of the slit ($g_1$) are 0.9 mm and 0.8 mm, respectively. With the above size of the twin capacitor, the capacitance is 600 pF, tan $\delta=0.7\%$, the insulation resistance between electrodes is $2\times10^6$ M$\Omega$, and the breakdown voltage is AC 40 kilovolts (p-p).

Figures 12A, 12B:
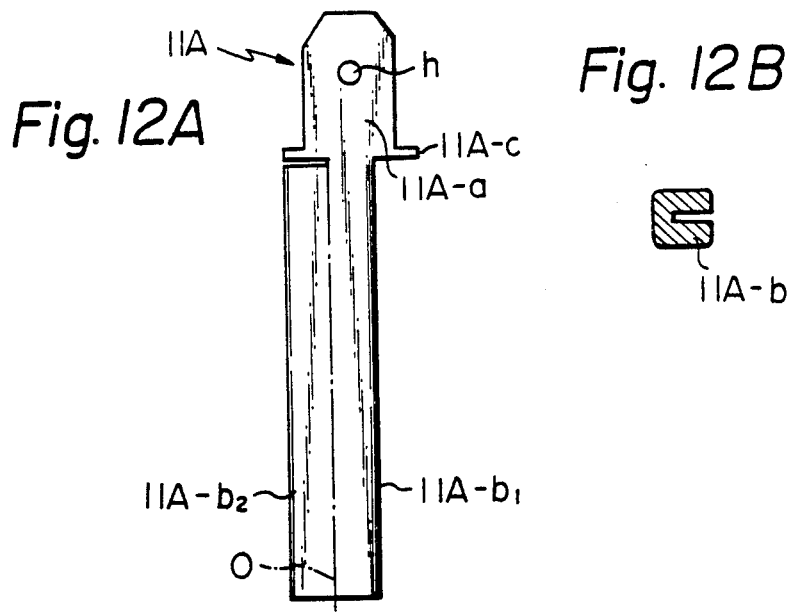
FIGS. 12A and 12B show the structure of the conductor rod according to the present invention.

FIGS. 12A and 12B show the modification of conductor rods 11 and 12. The modified conductor rod 11A has a thin conductive plate (for instance, aluminium plate) having the end terminal portion 11A-$a$ which has a hole (h) for engaging with an external lead line, an elongated linear portion (11A-$b_1$ and 11A-$b_2$) extending below said end terminal portion 11A-$a$ so that the first portion 11A-$b_1$ is just below the end terminal portion 11A-$a$, and the flange 11A-$c$ provided between said end terminal portion and the elongated linear portion. That flange 11A-$c$ operates as a stopper which touches with the inner surface of the plate 19a of the housing 19. The elongated linear portion is folded along the longitudinal center line (o) so that two portions 11A-$b_1$ and 11A-$b_2$ are laminated to each other. Therefore, the cross sectional view of the elongated linear portion is almost rectangular as shown in FIG. 12B.

Figure 13B:
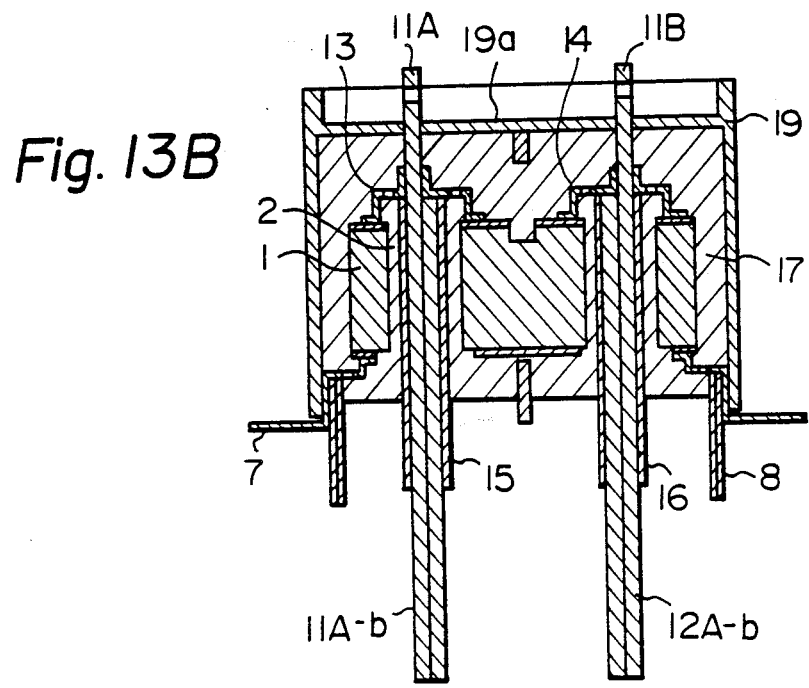
FIG. 13B is a cross sectional view of the capacitor of FIG. 13A.
Figure 13A:
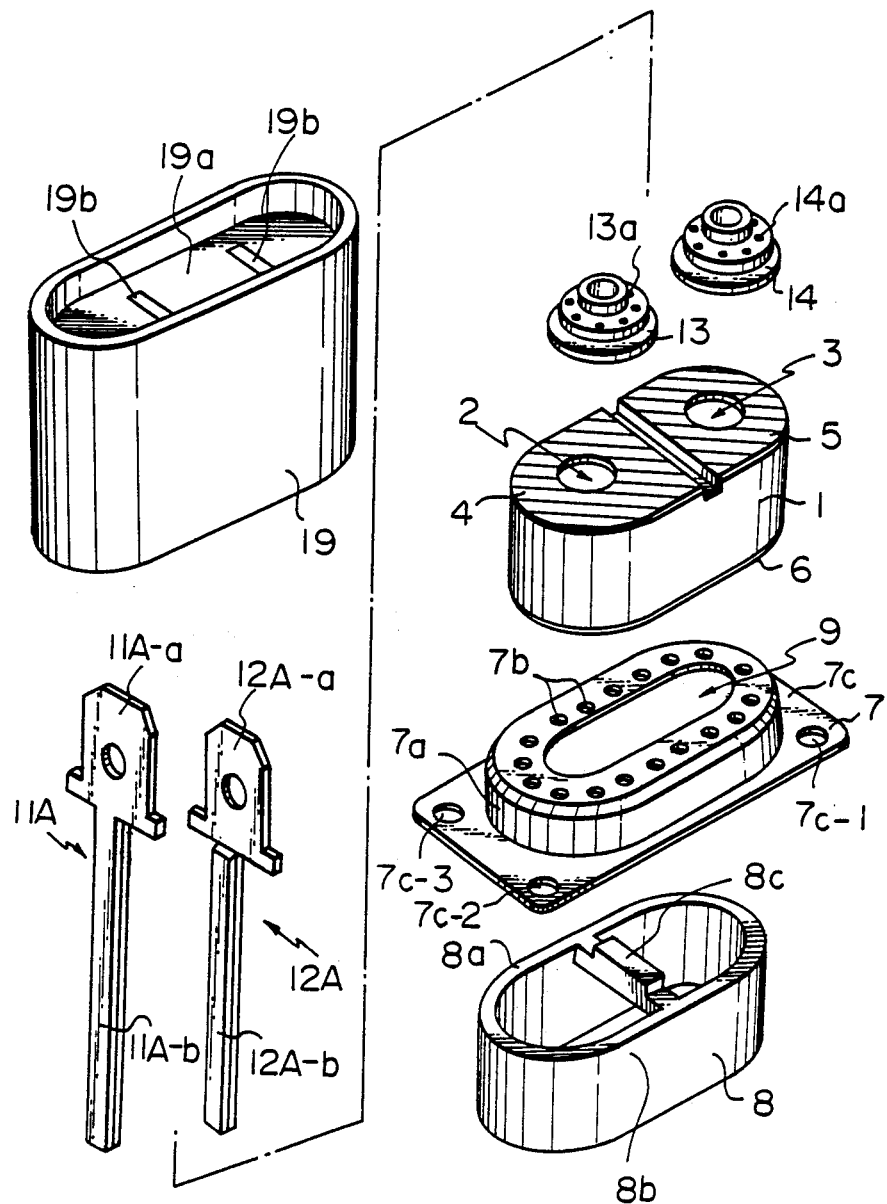
FIG. 13A is a disassembled view of the capacitor utilizing the conductor rods shown in FIGS. 12A and 12B.

FIG. 13A shows the capacitor which utilizes the conductor rods 11A and 12A of FIGS. 12A and 12B in the disassembled form, and FIG. 13B is the cross sectional view of that capacitor. It should be noted that the feature of the capacitor of FIGS. 13A and 13B is the rectangular conductor rods 11A and 12A, and other portions of the capacitor of FIGS. 13A and 13B are the same as those in FIG. 6 and FIG. 7.

In FIG. 13A, the insulation tubes 15 and 16 covering the conductor rods 11A and 12A are not shown for the sake of the simplicity of the drawing.

The conductor rods of FIGS. 12A and 12B have the advantages as enumerated below.

(a) A conductor rod can be manufactured through a single press process, thus, the manufacturing cost of a conductor rod is reduced.

(b) The position of an end terminal portion is very accurately manufactured, since that end terminal portion is integral with the elongated linear portion, and thus, the connection with an external circuit is very reliable.

Figure 14:
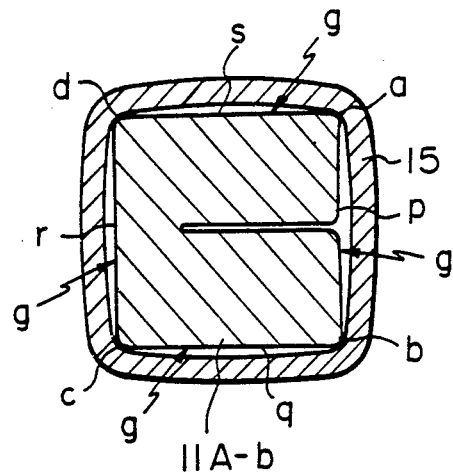
FIG. 14 is a cross sectional view of the conductor rod covered with the insulation tube.

(c) The insulation tubes 15 and 16 can easily cover the conductor rods, since the elongated portion of the conductor rods is rectangular and a gap (g) is provided between the conductor and the tube as shown in FIG. 14. In FIG. 14, the edges (a, b, c, d) of the elongated portion of the conductor rod contact with the internal surface of the insulation tube, but a gap (g) is provided between each side of the conductor rod and those of insulation tube because of the rectangular shape of the conductor rod and the tension of the tube. Since the contact area between the conductor rod and the insulation tube is small because of the presence of the gaps (g), the friction between a rod and tube is minimum, and it is easy to cover the rod with the tube. Further, said gaps (g) can absorb the stress generated in the insulator 17.

Figure 15:
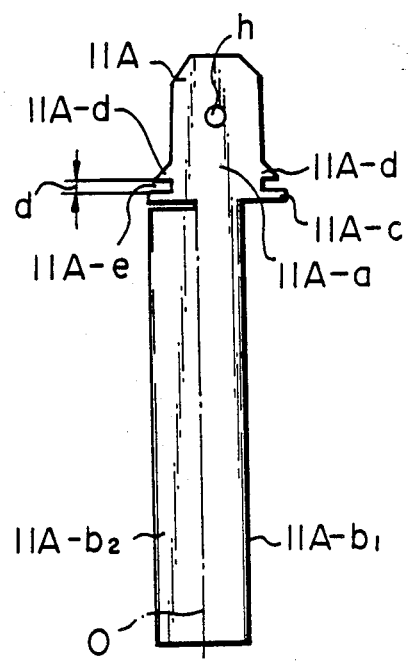
FIG. 15 shows an alternative for the conductor rod.

FIG. 15 is another modification of the conductor rod 11 and/or 12. The conductor rod 11A of FIG. 15 has a thin conductive plate (for instance, aluminium plate) having the end terminal portion 11A-$a$ which has a hole (h) for engaging with an external lead line, an elongated linear portion (11A-$b_1$ and 11A-$b_2$) extending below said end terminal portion 11A-$a$ so that the first portion 11A-$b_1$ is just below said end terminal portion. The first flange 11A-$c$ is provided at the foot of the end terminal portion between said end terminal portion and the elongated linear portion. The second flange 11A-d confronts with said first flange 11A-c. A pair of slits 11A-e are provided between two flanges at both the sides of the end terminal portion. The width (d) of said slits is almost the same as the thickness of the upper surface plate 19a of the housing 19. The edges of the second flanges 11A-d are slanted as shown in FIG. 15. The elongated linear portion is folded along the longitudinal center line (o) so that two portions 11A-$b_1$ and 11A-$b_2$ are laminated to each other. Comparing FIG. 15 with FIG. 12A, the feature of the conductor rod of FIG. 15 is the presence of the slit 11A-e between two flanges. That slit and/or the flanges facilitate to support the housing 19. Since the housing 19 is supported by the slits of the conductor rods, which are located at the center of the capacitor, the expansion and/or the contraction of the housing 19 and/or the insulator 17 becomes symmetrical with regard to the center of the capacitor, thus, the expansion and/or the contraction at the central portion is small, and no gaps or cracks are generated at the central portion of the insulator and/or the housing.

Figure 16:
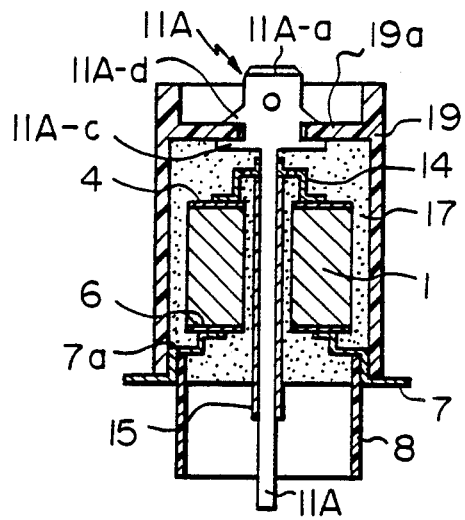
FIG. 16 is a cross sectional view of the capacitor which utilizes the conductor rod of FIG. 15, FIGS. 17A and 17B show other alternatives for the conductor rods.

FIG. 16 shows the cross sectional view of the capacitor which utilizes the conductor rods 11A of FIG. 15. It should be appreciated that the housing 19 of the capacitor in FIG. 16 is held in the slits 11A-e provided on the conductor rods 11A. When the housing 19 is covered on the capacitor, that housing 19 is entered in the slits through the slanted sides on the slits of the conductor rods.

Figure 17A:
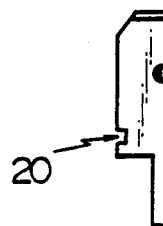
Figure 17B:
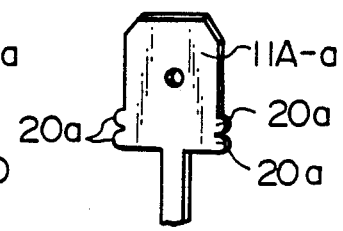
Figure 18A:
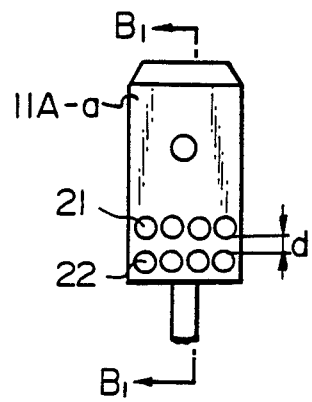
FIGS. 18A and 18B show still another alternative for a conductor rod.
Figure 18B:
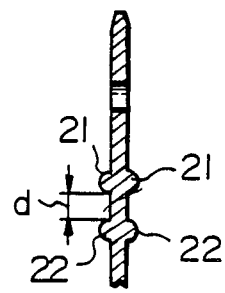

FIG. 17A is the alternative of the conductor rod of FIG. 15. In the figure, just a pair of slits 20 are provided, with no flange being provided. Another alternative of the conductor rod of FIG. 15 is shown in FIG. 17B, in which a pair of semicircled extensions 20a are provided at the bottom portion of the end terminal 11A-a, instead of a pair of flanges of FIG. 15, and between said extensions 20a, a slit is provided. FIGS. 18A and 18B show still another alternative of the conductor rod of FIG. 15, and in that alternative a plurality of projections 21 and 22 are provided on the surface of the end terminal portion 11A-a. Said projections 21 and 22 are aligned on separate two parallel lines as shown in the figures, and between those two lines, a slit is provided, and said projections hold the housing 19 between the slits. Said projections are provided on both the surfaces of the end terminal plate 11A-a.

The alternatives of the conductor rods of FIG. 15, FIG. 17A, FIG. 17B and FIGS. 18A and 18B have the same advantages as those of the conductor rod of FIG. 12A, and the formers have the further advantage that the housing is held rigidly at the center of the capacitor.

As described above in detail, the present capacitor has the feature that the insulator is held at the center of the capacitor, and so the expansion and/or the contraction of the insulator effects the center of the capacitor. Therefore, no gaps or cracks occur at the central portion of the capacitor in spite of frequent heating and cooling experienced in a microwave oven. Therefore, an superior noise filter for that microwave oven is obtained by utilizing the present capacitors.

From the foregoing, it will now be apparent that a new and improved through type high withstand voltage ceramic capacitor has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A through type twin high-withstand-voltage ceramic capacitor comprising;
    (a) a rectangular ground conductor plate unit (7) having a plate (7c) and an elevated substantially elliptic portion (7a) elevated from said plate (7c), said elevated portion (7a) having a plurality of relatively small holes (7b) on the closed peripheral line of the elevated portion (7a) and a pair of relatively larger holes (9, 10),
    (b) a capacitor half assembly having a substantially elliptic column shaped ceramic body (1), a pair of separated electrodes (4, 5) disposed on the upper surface of said ceramic body, and a common electrode (6) disposed on the bottom surface of said ceramic body (1), said ceramic body (1) and the electrodes (4, 5, 6) disposed thereon having a pair of common holes (2, 3) therethrough in the thick vertical direction of the ceramic body (1), and said capacitor half assembly being disposed on said elevated portion (7a) within the range defined by said relatively small holes (7b),
    (c) a pair of circular caps (13, 14) each having an elevated portion (13a, 14a) being provided on the closed peripheral line of each of said caps (13, 14), said caps (13, 14) being disposed on each of said separated electrodes (4, 5), respectively,
    (d) a pair of conductive rods (11, 12) each respectively passing through a hole of said ground conductor plate unit (7), the capacitor half assembly and the cap (13, 14), and said conductor rods being fixed to said caps,
    (e) a pair of insulation tubes (15, 16) covering the conductive rods (11, 12) so that those conductive rods (11, 12) do not electrically contact the common electrode (6) and the ground conductor plate unit (7),
    (f) a hollow substantially elliptic column shaped plastic cover (8) positioned below said ground conductor plate unit (7) covering said insulation tubes (15, 16), said cover (8) having a bridge (8c) across a pair of substantially parallel side walls (8a, 8b) of said cover (8) so that said bridge (8c) separates the cross section of the cover (8) into two generally circular areas,
    (g) an insulator (17) injected into said cover (8), and said holes (2, 3) of the capacitor half assembly, also enclosing said capacitor half assembly.

2. A through type twin high-withstand-voltage ceramic capacitor according to claim 1, further comprising a housing enclosing said capacitor half assembly, said housing (19) having a hollow, substantially elliptic column shaped external wall (19d), a flat top cover (19a) disposed at about the top of the external wall (19d) and a bridge (19c) disposed on the bottom surface of said flat top cover (19a) across a pair of substantially parallel external walls (19d) thereof so that said bridge (19c) separates the cross section of the housing (19) into two generally circular areas, said housing (19) being filled with said insulator (17).

3. A through type twin high-withstand-voltage ceramic capacitor according to claim 2, wherein the thermal coefficient of linear expansion of the housing (19) is smaller than that of the insulator (17).

4. A through type twin high-withstand-voltage ceramic capacitor according to claim 1, wherein a slit ($g_1$)

is provided in the ceramic body (1) between the pair of separated electrodes (4, 5) and the width and the depth of said slit ($g_1$) is in the range from 0.5 mm to 1.0 mm.

5. A through type twin high-withstand-voltage ceramic capacitor according to claim 4, wherein the bottom of the slit is circularly curved.

6. A through type twin high-withstand-voltage ceramic capacitor according to claim 2, wherein each of said conductor rods is made of thin conductive plate having an end terminal portion which is positioned above a flat top cover (19a) of the housing (19), and an elongated linear portion extending integrally below said end terminal portion, through said ceramic body (1) and said cover (8), and said elongated linear portion has the lamination of said thin conductive plate folded at one side.

7. A through type twin high-withstand-voltage ceramic capacitor according to claim 6, wherein each of said conductor rods has a pair of flanges sandwiching a slit between said end terminal portion and said elongated linear portion so that said slit supports the flat top cover of the housing.

8. A through type twin high-withstand-voltage ceramic capacitor according to claim 6, wherein one of said flanges is slanted to facilitate easy insertion of the conductor rod into the flat top cover of the housing.

9. A through type twin high-withstand-voltage ceramic capacitor according to claim 6, wherein each of said conductor rods has a plurality of projections on a pair of parallel lines on the surface of the end terminal portion so that a slit is provided between said parallel lines of projections.

10. A through type twin high-withstand-voltage ceramic capacitor, comprising:
   a ground conductor plate unit having a peripheral plate portion and an elevated portion within said plate portion, said elevated portion having a plurality of relatively small holes forming an enclosed area thereon, and a pair of relatively larger holes in said enclosed area;
   a capacitor half assembly having a column shaped ceramic body;
   a pair of separated electrodes disposed on the upper surface of said ceramic body, and a common electrode disposed on the bottom surface of said ceramic body;
   said ceramic body and the electrodes disposed thereon having a pair of common holes therethrough, and said capacitor half assembly being disposed on said elevated portion of said ground conductor plate unit in said enclosed area;
   a pair of caps respectively disposed on said separated electrodes;
   a pair of conductive rods each respectively passing through a hole of said ground conductor plate unit, the capacitor half assembly and the cap, said conductor rods being respectively attached to said caps;
   insulation means for preventing the conductive rods from electrically contacting the common electrode and the ground conductor plate;
   a hollow column shaped cover formed of an insulating material and being positioned below said ground conductor plate, said cover including a bridge element extending across opposing walls thereof so that said bridge element separates the cross section of the cover into two areas of substantially the same shape; and
   an insulator injected into said cover and said holes of the capacitor half assembly and enclosing said capacitor half assembly.

11. A through type twin high-withstand-voltage ceramic capacitor according to claim 10, further comprising a housing enclosing said capacitor half assembly, said housing having a hollow, column shaped external wall, a flat top cover disposed at about the top of the external wall, and a bridge disposed on the bottom surface of said flat top cover across opposing walls of said housing so that said bridge separates the cross section of the housing into two areas of substantially the same shape; said housing being filled with said insulator.

12. A through type high-withstand-voltage ceramic capacitor according to claim 11, wherein the thermal coefficient of linear expansion of said housing is smaller than that of said insulator.

13. A through type twin high-withstand-voltage ceramic capacitor according to claim 10, wherein a slit is provided in the ceramic body between the pair of separated electrodes, and the width and the depth of said slit is in the range from 0.5 mm to 1.0 mm.

14. A through type twin high-withstand-voltage ceramic capacitor according to claim 13, wherein the bottom of the slit is circularly curved.

15. A through type twin high-withstand-voltage ceramic capacitor according to claim 11, wherein each of said conductor rods is made of thin conductive plate having an end terminal portion which is positioned above said flat top cover of the housing, and an elongated linear portion extending integrally below said end terminal portion, through said ceramic body and said cover, and said elongated linear portion has a lamination of said thin conductive plate folded at one side.

16. A through type twin high-withstand-voltage ceramic capacitor according to claim 15, wherein each of said conductor rods has a pair of flanges sandwiching a slit between said end terminal portion and said elongated linear portion so that said slit supports the flat top cover of the housing.

17. A through type twin high-withstand-voltage ceramic capacitor according to claim 15 wherein one of said flanges is slanted to facilitate easy insertion of the conductor rod into the flat top cover of the housing.

18. A through type twin high-withstand-voltage ceramic capacitor according to claim 15 wherein each of said conductor rods has a plurality of projections on a pair of parallel lines on the surface of the end terminal portion so that a slit is provided between said parallel lines of projections.

* * * * *